United States Patent
Lugassi et al.

(10) Patent No.: US 8,857,961 B2
(45) Date of Patent: Oct. 14, 2014

(54) UV CURABLE INK WITH IMPROVED ADHESION

(75) Inventors: Elena Lugassi, Netanya (IL); Amir Shapira, Netanya (IL); Or Brandstein, Netanya (IL); Liat Neeman, Netanya (IL); Eytan Cohen, Netanya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 638 days.

(21) Appl. No.: 11/821,258

(22) Filed: Jun. 21, 2007

(65) Prior Publication Data

US 2008/0316244 A1 Dec. 25, 2008

(51) Int. Cl.
*C09D 11/00* (2014.01)
*C09D 11/101* (2014.01)

(52) U.S. Cl.
CPC .................................. *C09D 11/101* (2013.01)
USPC ....................................................... 347/100

(58) Field of Classification Search
USPC ....................................................... 347/100
See application file for complete search history.

(56) References Cited

U.S. PATENT DOCUMENTS

| | | | |
|---|---|---|---|
| 5,430,093 A | 7/1995 | Miyamoto et al. | |
| 5,919,834 A | 7/1999 | Downs et al. | |
| 6,713,230 B2 | 3/2004 | Chang et al. | |
| 7,131,723 B2 | 11/2006 | Hoshino | |
| 7,189,766 B2 | 3/2007 | Takahashi et al. | |
| 2004/0050292 A1* | 3/2004 | Nakajima et al. | 106/31.27 |
| 2005/0168550 A1* | 8/2005 | Deckers et al. | 347/100 |
| 2006/0118001 A1* | 6/2006 | Sato et al. | 106/412 |
| 2007/0064050 A1* | 3/2007 | Ohkubo et al. | 347/52 |
| 2007/0070162 A1 | 3/2007 | Yokoyama | |
| 2007/0093571 A1 | 4/2007 | Tamai et al. | |
| 2007/0120881 A1 | 5/2007 | Tsubaki | |

FOREIGN PATENT DOCUMENTS

| | | |
|---|---|---|
| EP | 1491600 | 12/2004 |
| EP | 1676889 | 7/2006 |
| EP | 1686155 | 8/2006 |
| JP | 09118848 | 5/1997 |
| JP | 10195356 | 7/1998 |
| JP | 2004018546 | 1/2004 |
| JP | 2005060519 | 3/2005 |
| JP | 2005139305 | 6/2005 |
| JP | 2005139405 | 6/2005 |
| JP | 2006083385 | 3/2006 |
| JP | 2006169419 | 6/2006 |
| JP | 2006524731 | 11/2006 |
| WO | 2004092287 | 10/2004 |
| WO | 2005/049735 | 6/2005 |
| WO | 2005049735 | 6/2005 |
| WO | 2007029468 | 3/2007 |

* cited by examiner

*Primary Examiner* — Laura Martin

(57) ABSTRACT

The present invention is drawn to photo-curable ink-jet ink compositions, systems, and methods. One exemplary ink-jet ink composition includes a liquid vehicle, a milled pigment, a photo initiator and a halogenated polyolefin. In this embodiment, the addition of the halogenated polyolefin improves adhesion to a non-porous substrate or a low surface tension substrate such as polypropylene.

27 Claims, No Drawings

UV CURABLE INK WITH IMPROVED ADHESION

BACKGROUND OF THE INVENTION

Inks used in the ink-jet printing industry are typically liquid dispersions, solutions, or emulsions. Known types of ink include oil-based inks, non-aqueous solvent based inks, water-based inks, and solid inks. The ink-jet printing process involves jetting droplets of ink from orifices of a print head onto a print medium. Then, the deposited ink droplets are either affirmatively dried, e.g., using heat or forced air, or allowed to dry at ambient conditions.

Recently, curing of ink by radiation, and in particular ultraviolet (UV) curing, has become popular. In these cases, special radiation-curable ink is used and the image is cured by exposure to a radiation source. The term "curing" in the context of the present application refers to a process of converting a liquid, such as ink, into a solid by exposure to actinic radiation. The use of radiation-curable inks and the curing process are rapidly becoming an alternative to the established conventional drying process.

Among the problems associated with the use of many types of inks is poor adhesion to non-porous or low surface tension substrates such as polypropylene, vinyl, polyolefins, and the like. Polypropylene, for example, is widely used for rigid and semi-rigid Point-of-Purchase displays. Because the surface of the polypropylene is inert and has low surface tension, polar solvents such as acrylic monomers will not wet it. As a result a poor adhesion is obtained. Additionally, depending on the ink load, when printing inks on top of one another, proper cohesion between ink layers on substrate can be less than desirable. Further, with specific reference to UV curable inks, these inks are often prepared using oligomers such that the inks have a viscosity that is much higher than more typical solvent or water based inks. Jetting of such viscous inks presents certain difficulties, and further, can typically only be jetted at low frequencies, causing slower printing speeds. Because these inks are more viscous, they are also usually jetted at elevated temperatures, e.g., above about 40° C. This elevated temperature allows some control over the inks otherwise high viscosity, but adversely affects the life of printing architecture including the print head. Thus, there is significant room for improvement in the area of UV curable inks, particularly as it relates to adhesion to polypropylene or other non-porous, low surface tension substrates.

DETAILED DESCRIPTION OF THE PREFERRED EMBODIMENT(S)

Before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a pigment" includes reference to one or more of such materials.

The term "curing" refers to the process of converting a liquid, such as, for example ink, to a solid by exposing it to an actinic radiation, such as photo radiation, e.g., ultraviolet radiation.

The term "non-porous" or "low surface tension" can be used interchangeably, and when referring to a substrate, such as a media substrate, includes surfaces that can have relatively poor water permeability, absorption, and/or adsorption. Vinyl and other plastic sheets or films, metals, coated offset media, glass, and other similar substrates are considered to be non-porous. In accordance with these definitions, a photo-curable ink composition for ink-jet printing with improved adhesion to a non-porous, low surface tension substrate can comprise a liquid vehicle, a milled pigment having been milled in a milling solvent, e.g., triethyleneglycol divinyl ether (DVE-3), a photo initiator, and a halogenated polyolefin, e.g. chlorinated polypropylene.

In another embodiment, an ink-jet ink printing system can comprise a non-porous or low surface tension substrate such as polypropylene, a photo-curable ink-jet ink, and a photo energy source configured to apply photo energy to the ink-jet ink once printed on the non-porous substrate. The photo energy can include UV, IR, and/or visible light. More specifically, the photo energy can have a frequency and energy level suitable for curing the photo-curable ink-jet ink. The ink-jet ink can comprise a liquid vehicle, a milled pigment, photo initiator and a halogenated polyolefin.

In another embodiment, a method of printing an image can comprise jetting a photo-curable ink-jet ink onto a non-porous or low surface tension substrate such as polypropylene or various other plastics and plastic derivatives. The photo-curable ink-jet ink can comprise a liquid vehicle, a milled pigment, a photo initiator and a halogenated polyolefin. Another step includes applying photo energy to the photo-curable ink-jet ink once printed on a substrate, wherein the photo energy has a frequency and energy level suitable for curing the photo-curable ink-jet ink. It is also notable that though the systems and methods are useful on more difficult printing substrates, e.g., non-porous substrates or low surface tension substrates, these inks are also acceptable for printing on porous substrates.

In accordance with the general teachings of the present invention, as these inks are typically photo-curable, according to some embodiments of the present invention, the curing radiation can be ultraviolet radiation and the ink used for printing can be ultraviolet (UV) curable ink containing UV activated initiators, also known as UV initiators. In these instances, curing radiation can be UV radiation radiated by UV lamps, blue lasers, UV lasers, or ultraviolet LEDs, for example. According to some embodiments of the present invention, the curing radiation may be provided by a source of ultraviolet radiation operating in a continuous mode. According to other embodiments of the present invention, the curing radiation may be provided by a source of ultraviolet radiation operating in a flash or pulsed mode. Other methods of applying UV radiation can also be implemented as would be known by those skilled in the art after considering the present disclosure. This being stated, other curing systems including those other than UV curing systems can also be used, as long as the radiation used is appropriate to initiate the curing process of the ink-jet ink, e.g., IR or visible light systems.

Some embodiments of the present invention are directed to or include various compositions of photo-curable ink-jet recording fluids. Thus, the ink composition can comprise oligomers, multifunctional acrylates and urethane acrylates. Additionally, the ink composition can comprise a mixture of acrylates that are capable of undergoing polymerization reaction under UV curable radiation in the presence of UV-activated initiators. Non-limiting examples of UV-activated initiators can include alpha amino ketone UV photoinitiators such as Ciba Irgacure 907, Ciba Irgacure 369, and Ciba Irgacure 379; bis acylphosphine oxide (BAPO) UV photoinitiators such as Irgacure 907 or Irgacure 819, Darocur 4265, and Darocur TPO; alpha hydroxy ketone UV photoinitiators such as Irgacure 184 and Darocur 1173; including photoinitiators with or without sensitizers such as Darocur ITX (2-isopropyl thioxanthone). Regarding the acrylates, these compositions can be useful as some of the acrylates are highly reactive. Further, some acrylates, such as monoacrylates, have good solvency, high flexibility, and low Glass Transition Temperature (Tg). Low Tg can improve the flexibility of the ink layer at room temperature. For example, in one embodiment, a monoacrylate having a Tg of less than about 30° C. or 40° C. can be used to improve the flexibility of the ink layer compared to the same ink prepared without the monoacrylate.

Monoacrylates have good adhesion to plastic, provide higher flexibility, and thus, enhance the adhesion to plastic even when the plastic is flexed. Some monoacrylates can modify or swell certain plastic substrates and other non-porous, porous, and/or low surface tension substrates such as polyvinyl chlorides (PVC), polymethyl methacrylates (PMMA), and polyolefins. This modification or swelling of the substrate can also improve adhesion. Other acrylates, such as triacrylates, can contribute to the ink low shrinkage, good reactivity, improved mechanical properties, and chemical resistance, e.g., the higher the molecular weight, the lower the crosslink density and the lower the shrinkage. Still further, some of the acrylates, such as diacrylates, possess high solvency and high reactivity facilitating good adhesion to non-porous surfaces. This being stated, any suitable acrylates, or a combination of acrylates for achieving a balance of these or other properties, can be used. Further, although the scope of present invention is not limited in this respect, the acrylates for use can also be modified or derivatized acrylates. Examples include polyetherpolyol acrylate, polyether acrylate oligomer, cyclic thimethylopropane formal acrylate (CTFA), or amine acrylate. Amine acrylates in particular, such as CN386 and Genomer 5275, can be useful for improving cohesion between layers of printed ink-jet inks, as well as adhesion to non-porous substrates upon printing.

The relative amounts of the different components of the ink-jet recording composition may vary. For example, the relative amount of the photo initiator may range from about 0.1 wt % to about 8 wt %, and in another embodiment, from about 0.1 wt % to about 4 wt %. In other embodiments, the relative amount of the photo initiator can be from about 0.2 wt % to about 2 wt %, or even from about 0.2 wt % to about 1 wt %. In other embodiments, the relative amount of the halogenated polyolefin can be from about 0.5 wt % to about 4 wt %, or even from about 1 wt % to about 2.5 wt %. Likewise, the relative amount of various other components that can be present can range from 1 wt % to 30 wt %. For example, an acrylate can be present at from 1 wt % to 8 wt %. Alternatively or additionally, the relative amount of 5 wt % to 25 wt % of vinyl caprolactam can be used to improve the adhesion of the ink layers to the substrate as well.

The composition may further include any coloring agent, such as for example pigments such as milled pigments, and optionally additives such as dispersants, wetting agents, surfactants, leveling agents, and the like. Non-limiting examples of pigments that can be used in the formulations of exemplary embodiments of the present invention include E4GN Yellow 150, RT-355-Magenta, Hostaperm Blue P-BFS Cyan, Sunfast Black 7, PV fast blue BG, PV fast red E5B, PV fast yellow HG, permanent black R30, other pigments, or mixture of several pigments. More generally, the black and colored pigments for use in the invention are not particularly limited, and inorganic pigments or organic pigments may be used. Suitable inorganic pigments include, for example, titanium oxide, cobalt blue ($CoO$—$Al_2O_3$), chrome yellow ($PbCrO_4$), and iron oxide. Suitable organic pigments includes, for example, azo pigments, polycyclic pigments (e.g., phthalocyanine pigments, perylene pigments, perynone pigments, anthraquinone pigments, quinacridone pigments, dioxazine pigments, thioindigo pigments, isoindolinone pigments and quinophthalone pigments), dye chelates (e.g., basic dye type chelates and acidic dye type chelate), nitropigments, nitroso pigments, and the like. In conjuction with these or other pigments, non-limiting examples of dispersants that can be used in the formulations of exemplary embodiments of the present invention include Solsperse 32000, Solsperse 39000, Solsperse 5000, Solsperse 22000, Disperbryk 163, Disperbyk 167, Disperbyk 168, Disperbyk 180, Disperbyk 190, Disperbyk 191, or the like.

As mentioned, the ink-jet ink compositions can optionally also include wetting agents. Non-limiting examples of such wetting agents can include siliconepolyether acrylate such as Tego Rad 2200 N, Tego Rad 2300, and Byk 358N. The inks can also include polyether modified poly-dimethyl-siloxane wetting agents such as Byk 333, Byk 307, and Silwet L-7604. If used, wetting agents can be present at from 0.01% to about 10% by weight of the ink-jet ink composition.

A unique feature of the photo-curable inks of the present invention is the improved adhesion to non-porous and low surface tension media substrates such as plastics. These inks are configured in such a way that allows the non-porous, low surface tension substrate to adhere to the ink better after jetting onto the substrate through a halogenated polyolefin such as a chlorinated polypropylene.

As mentioned, the ink-jet ink compositions can be jetted onto a media substrate. Additionally, the systems and methods of the present invention can include the media substrate. The media substrate employed in the present invention includes non-porous and low surface tension media substrates. Non-limiting examples include plastics, PVC, banner paper, and polypropylenes, and synthetic paper, such as Yupo synthetic paper. Banner paper is specifically configured for printing banners, has a smooth surface, and is typically designed for color printing. Yupo synthetic paper is one example of synthetic paper. Yupo is a specific type of polypropylene that is waterproof, stain resistant, and extremely strong and durable.

The photo-curable inks of the present invention are not limited to one type of polyolefin. Non-limiting examples of halogenated polyolefins can include chlorinated polyethylene, chlorinated polypropylene, chlorinated polybutylene, brominated polyethylene, brominated polypropylene, brominated polybutylene, fluorinated polyethylene, fluorinated polypropylene, and fluorinated polybutylene. Thus, as noted by these examples, although chlorine is the preferred halogen used in the present invention, other halogens that have similar chemical properties which are compatible with the teachings of the present invention can be used. Non-limiting examples are Bromine or Fluorine.

Another unique feature of the photo-curable inks of the present invention is that they can be prepared such that they do not require removal of air or other gases from the ink prior to and/or during use, even at high jetting frequencies, e.g., greater than 18-20 KHz, greater than 25 KHz, or greater than even 29 KHz. As a note, the fact that these inks can be fired at high frequencies does not limit these inks to high firing frequency systems. These inks can also be fired at relatively low firing frequencies as well. This being stated, generally, with UV and other photo-curable inks, such inks are typically characterized by high gas content which interferes with the ink-jet process. The inks of the present invention can be characterized as having unusually low gas content. In some embodiments, the process used in milling of pigments can contribute to this advantage. For example, by milling pigments with specific solvents, air or gas generation or release can be minimized or eliminated. An example of an appropriate solvent for this use in achieving this goal can be triethyleneglycol divinyl ether (DVE-3), which is one example of a milling solvent that enables the print heads to be operated at high ejection frequency without prior ink degassing. It is notable that DVE-3 is merely one example of such a solvent, and depending on the pigment, other solvents can also provide a similar function. Thus, there are other solvent choices for milling that can be used in accordance with embodiments of the present invention. In one aspect of the invention, pigments and milling solvents can be selected that are relatively non-reactive to one another, or solvent(s) can be selected that has minimal to no gas solvency for the pigment particles. It is also notable that UV inks of the prior art often have dissolved oxygen values of between 6 to 8 ppm by weight in the ink, whereas the inks of the present invention, which use a milling solvent having low gas solvency for the pigment, e.g., DVE-3, can have dissolved oxygen values less than 5 ppm by weight, e.g., from 3 to 5 ppm by weight, which can reduce the reactivity of the ink.

Typically, in order to produce full color images, an ink set can include cyan, magenta, and yellow ink-jet ink compositions, or alternatively, cyan, light cyan, magenta, light magenta, and yellow ink-jet ink compositions. Black inks can also be included in these ink sets. Other combinations are also possible.

EXAMPLES

In the following examples of ink compositions, ingredient designations are in weight percentages, as indicated. It is noted that the following examples do not limit in any way the scope of the present invention. This being stated, the following examples illustrate the embodiments of the invention that are presently best known. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following Examples provide further detail in connection with what are presently deemed to be the most practical and preferred embodiments of the invention.

Example 1

| Ingredients | Wt % |
| --- | --- |
| Ethoxylated (15) Trimethylopropane Triacrylate | 20% |
| 1,6-hexanediol diacrylate | 27.7% |
| Tetrahydrofurfuryl Acrylate | 25% |
| Amine Acrylate | 2% |
| Chlorinated Polypropylene | 2% |
| 1-Butanone,2-(Dimethylamino)-2-[(4-methylphenyl) methyl]-1-[4-(4-Morphinolinyl) Phenyl | 2% |
| 2,4,6-Trimethyl benzoylphenyl-phosphineoxide | 2% |
| Isomeric mixture of 2-isopropylthioxanthone and 4-isopropylthioxanthone | 2% |
| Copper, [29H,31H-phthalocyaninato(2-)-κN29, κN30, κN31, κN32]-, (SP-4-1)-(9CI) | 2% |
| Divinyl Ether | 7% |
| Polymeric dispersant | 1% |
| Siliconepolyether Acrylate | 0.2% |

Example 2

| Ingredients | Wt % |
| --- | --- |
| Ethoxylated (15) Trimethylopropane Triacrylate | 20% |
| 1,6-hexanediol diacrylate | 27.7% |
| Tetrahydrofurfuryl Acrylate | 25% |
| Amine Acrylate | 2% |
| Chlorinated Polypropylene | 2% |
| 1-Butanone,2-(Dimethylamino)-2-[(4-methylphenyl) methyl]-1-[4-(4-Morphinolinyl) Phenyl | 2% |
| 2,4,6-Trimethylbenzoylphenyl-phosphineoxide | 2% |
| Isomeric mixture of 2-isopropylthioxanthone and 4-isopropylthioxanthone | 2% |
| Copper, [29H,31H-phthalocyaninato(2-)-κN29, κN30, κN31, κN32]-, (SP-4-1)-(9CI) | 2% |
| Divinyl Ether | 7% |
| Polymeric dispersant | 1% |
| Siliconepolyether Acrylate | 0.2% |

Example 3

| Ingredients | Wt % |
| --- | --- |
| Ethoxylated (15) Trimethylopropane Triacrylate | 20% |
| 1,6-hexanediol diacrylate | 27.7% |
| Tetrahydrofurfuryl Acrylate | 20% |
| Vinyl caprolactam | 5 |
| Amine Acrylate | 2% |
| Chlorinated Polypropylene | 2% |
| 1-Butanone,2-(Dimethylamino)-2-[(4-methylphenyl) methyl]-1-[4-(4-Morphinolinyl) Phenyl | 2% |
| 2,4,6-Trimethylbenzoylphenyl-phosphineoxide | 2% |
| Isomeric mixture of 2-isopropylthioxanthone and 4-isopropylthioxanthone | 2% |
| Copper, [29H,31H-phthalocyaninato(2-)-κN29, κN30, κN31, κN32]-, (SP-4-1)-(9CI) | 2% |
| Divinyl Ether | 7% |
| Polymeric dispersant | 1% |
| Siliconepolyether Acrylate | 0.2% |

Example 4

| Ingredients | Wt % |
| --- | --- |
| Hexafunctional urethan acrylate | 20% |
| 1,6-hexanediol diacrylate | 27.7% |
| Tetrahydrofurfuryl Acrylate | 25% |
| Amine Acrylate | 2% |
| Chlorinated Polypropylene | 2% |
| 1-Butanone,2-(Dimethylamino)-2-[(4-methylphenyl) methyl]-1-[4-(4-Morphinolinyl) Phenyl | 2% |

-continued

| Ingredients | Wt % |
|---|---|
| 2,4,6-Trimethylbenzoylphenyl-phosphineoxide | 2% |
| Isomeric mixture of 2-isopropylthioxanthone and 4-isopropylthioxanthone | 2% |
| Copper, [29H,31H-phthalocyaninato(2-)-κN29, κN30, κN31, κN32]-, (SP-4-1)-(9CI) | 2% |
| Divinyl Ether | 7% |
| Polymeric dispersant | 1% |
| Siliconepolyether Acrylate | 0.2% |

According to exemplary embodiments of the present invention, the ink formulations were coated on polypropylene substrates and UV cured at approximately 200 mj/cm$^2$. The thickness of the ink layer was about 12.5 microns. The viscosity of the ink was lower than 30 cp, surface tension was 26.9 dyne/cm, and particle size was lower than 1 micron. The cured layer of ink did not show ink peeling or cracks and withstood standard abrasion and tape tests.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A photo-curable ink composition for ink jet printing with improved adhesion to a non-porous, low surface tension substrate, comprising:
   a liquid vehicle,
   a milled pigment, said milled pigment having been milled in a milling solvent comprising triethyleneglycol divinyl ether,
   a photo initiator, and
   a halogenated polyolefin,
   wherein the photo-curable ink composition has a dissolved oxygen content of less than 5 ppm by weight.

2. The composition of claim 1, wherein the composition includes a monoacrylate having Glass Transition Temperature (Tg) which improves the flexibility of the ink layer compared to the same ink prepared without the monoacrylate.

3. The composition of claim 1, wherein the composition includes an amine acrylate.

4. The composition of claim 1, wherein the halogenated polyolefin is a chlorinated polyolefin.

5. The composition of claim 1, wherein the halogenated polyolefin comprises chlorinated polypropylene.

6. The composition of claim 1, wherein the dissolved oxygen content of less than 5 ppm by weight is achieved without removal of gases from the composition.

7. An ink jet ink printing system, comprising:
   a) a non-porous, low surface tension media substrate;
   b) at least one photo-curable ink-jet ink, comprising:
      i) a liquid vehicle,
      ii) a milled pigment said milled pigment having been milled in a milling solvent comprising triethyleneglycol divinyl ether,
      iii) photo initiator, and
      iv) a halogenated polyolefin,
      wherein the at least one photo-curable ink-jet ink has a dissolved oxygen content of less than 5 ppm by weight; and
   c) a photo energy source configured to apply photo energy to the ink-jet ink once printed on a substrate, said photo energy having a frequency and energy level suitable for curing the photo-curable ink-jet ink.

8. The system of claim 7, wherein the system includes two photo-curable ink-jet inks, each having a different hue or color density than the other.

9. The system of claim 7, wherein the at least one photo-curable ink-jet inks includes an amine acrylate in an amount that improves cohesion between printed photo-curable ink-jet ink layers.

10. The system of claim 7, wherein the at least one photo-curable ink-jet ink includes at least one of a vinyl caprolactam and an acrylate.

11. The system of claim 7, wherein the halogenated polyolefin is selected from a halogenated polyethylene, a halogenated polypropylene, and a halogenated polybutylene.

12. The system of claim 7, wherein the halogenated polyolefin comprises chlorinated polypropylene.

13. The system of claim 7, wherein the media substrate is a plastic substrate.

14. The system of claim 7, wherein the media substrate is a polypropylene.

15. The system of claim 7, wherein the media substrate is polyvinyl chloride.

16. The system of claim 7, wherein the media substrate is banner paper or synthetic paper.

17. The system of claim 7, wherein the dissolved oxygen content of less than 5 ppm by weight is achieved without removal of gases from the photo-curable ink jet ink.

18. A method of printing an image, comprising:
   a) jetting a photo-curable ink jet ink onto a non-porous, low surface tension media substrate, said photo-curable ink jet ink, comprising:
      i) a liquid vehicle,
      ii) a milled pigment, said milled pigment having been milled in a milling solvent comprising triethyleneglycol divinyl ether,
      iii) photo initiator, and
      iv) a halogenated polyolefin,
      wherein the photo-curable ink jet ink has a dissolved oxygen content of less than 5 ppm by weight; and
   b) applying photo energy to the photo-curable ink jet ink once printed on the media substrate, said photo energy having a frequency and energy level suitable for curing the photo-curable ink jet ink.

19. The method of claim 18, further comprising jetting a second photo-curable ink-jet ink onto the media substrate in layers with respect to the photo-curable ink jet ink, wherein the photo-curable ink jet ink has a different hue or color density than the second photo-curable ink jet ink.

20. The method of claim 18, wherein the photo-curable ink jet ink includes an amine acrylate in an amount that improves cohesion between the layers.

21. The method of claim 18, wherein the halogenated polyolefin is selected from a halogenated polyethylene, a halogenated polypropylene, and a halogenated polybutylene.

22. The method of claim 18, wherein the halogenated polyolefin comprises a chlorinated polypropylene.

23. The method of claim 18, wherein the media substrate is a plastic substrate.

24. The method of claim 18, wherein the media substrate is a polypropylene.

25. The method of claim 18, wherein the media substrate is polyvinyl chloride.

26. The method of claim 18, wherein the media substrate is banner paper or synthetic paper.

27. The method of claim 18, wherein the dissolved oxygen content of less than 5 ppm by weight is achieved without removal of gases from the photo-curable ink jet ink.

* * * * *

UNITED STATES PATENT AND TRADEMARK OFFICE
CERTIFICATE OF CORRECTION

PATENT NO. : 8,857,961 B2
APPLICATION NO. : 11/821258
DATED : October 14, 2014
INVENTOR(S) : Elena Lugassi et al.

It is certified that error appears in the above-identified patent and that said Letters Patent is hereby corrected as shown below:

In the claims

In column 7, line 28, in Claim 1, delete "ink jet" and insert -- ink-jet --, therefor.

In column 7, line 52, in Claim 7, delete "ink jet" and insert -- ink-jet --, therefor.

In column 8, line 25, in Claim 17, delete "ink jet" and insert -- ink-jet --, therefor.

In column 8, line 27, in Claim 18, delete "ink jet" and insert -- ink-jet --, therefor.

In column 8, lines 28-29, in Claim 18, delete "ink jet" and insert -- ink-jet --, therefor.

In column 8, line 36, in Claim 18, delete "ink jet" and insert -- ink-jet --, therefor.

In column 8, line 38, in Claim 18, delete "ink jet" and insert -- ink-jet --, therefor.

In column 8, line 41, in Claim 18, delete "ink jet" and insert -- ink-jet --, therefor.

In column 8, line 44, in Claim 19, delete "ink jet" and insert -- ink-jet --, therefor.

In column 8, line 45, in Claim 19, delete "ink jet" and insert -- ink-jet --, therefor.

In column 8, line 46, in Claim 19, delete "ink jet" and insert -- ink-jet --, therefor.

In column 8, lines 47-48, in Claim 20, delete "ink jet" and insert -- ink-jet --, therefor.

In column 8, line 65, in Claim 27, delete "ink jet" and insert -- ink-jet --, therefor.

Signed and Sealed this
Twenty-second Day of March, 2016

Michelle K. Lee
*Director of the United States Patent and Trademark Office*